(12) United States Patent
Metz et al.

(10) Patent No.: US 6,382,943 B1
(45) Date of Patent: May 7, 2002

(54) MULTIPLE INSERT TIRE MOLD AND ASSEMBLY METHOD

(75) Inventors: Joseph William Metz; Lloyd Glenn Whiteman, both of Frostburg; Samuel Eubanks Reckley, La Vale; William John Dormer, Frostburg, all of MD (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/806,806

(22) PCT Filed: Aug. 10, 1998

(86) PCT No.: PCT/US98/21264

§ 371 Date: Apr. 3, 2001

§ 102(e) Date: Apr. 3, 2001

(87) PCT Pub. No.: WO00/20184

PCT Pub. Date: Apr. 13, 2000

(51) Int. Cl.[7] .................................................. B29C 35/02
(52) U.S. Cl. ........................... 425/46; 29/428; 425/195; 425/812
(58) Field of Search ........................... 425/46, 195, 812; 29/428

(56) References Cited

U.S. PATENT DOCUMENTS

| 3,341,933 | A |   | 9/1967 | McPhaden et al. |
| 4,691,431 | A |   | 9/1987 | Hayata ...................... 29/526 R |
| 5,120,209 | A | * | 6/1992 | MacMillan ................... 425/46 |
| 5,234,326 | A |   | 8/1993 | Galli et al. .................... 425/46 |
| 5,290,163 | A | * | 3/1994 | Katsumata et al. ........... 425/47 |

FOREIGN PATENT DOCUMENTS

| GB | 588170 | 5/1947 |
| JP | 5-1119776 | 10/1976 |

* cited by examiner

*Primary Examiner*—James P. Mackey
(74) *Attorney, Agent, or Firm*—The Goodyear Tire & Rubber Co.; Frederick K. Lacher; Bruce L. Hendricks

(57) ABSTRACT

A multiple insert tire mold (10) has inserts (26) with radially extending ribs (28) for sliding engagement in a slot (22) in the outer ring back (12) of the mold and abutting surfaces (48) for venting exhaust gases from the mold (10).

11 Claims, 5 Drawing Sheets and a circumferentially extending slot in the radially inner surfaces with an opening in the end surfaces to the slot characterized by the steps of sliding rib members of a plurality of tread forming insert members into the slot at the opening for each of the segments and then connecting the segments to form a complete tread forming outer ring.

MULTIPLE INSERT TIRE MOLD AND ASSEMBLY METHOD

TECHNICAL FIELD

This invention relates to ventless tire molds of the type having multiple inserts mounted in a circular outer ring back. The inserts have abutting surfaces which provide micro gaps between the inserts for venting gases from the mold and at the same time produce smooth even tread surfaces after the curing cycle is completed without any visible bleeder vents.

BACKGROUND ART

In the past it has been proposed to provide inserts made from cutting a circumferentially complete tread ring such as that shown in U.S. Pat. No. 5,234,326. The rows of inserts were mounted in a section of the annular portion of the mold and held in place by retention plates. In another embodiment two rows of blocks were mounted in sections of the lower mold half and held in place by another retention ring. The assembly of these molds is dependent on fastening the retention rings to the mold which requires screws or other fasteners for clamping the retention rings against the mold. This is not desirable for tire molds where the mold is exposed to high temperatures, expansion and corrosive gases making it difficult to maintain the fasteners. Dirt and other molding byproducts may collect between the retention plates and the mold at the tire forming and vulcanizing surfaces which creates a contamination problem. Also special vents are required to take the gases away from the inserts.

DISCLOSURE OF INVENTION

The present invention is directed to a multiple insert tire mold in which the mold inserts are mounted in the outer ring back without requiring the addition of retention rings or other devices which may cause problems with mounting and contamination of the mold surface. Also with the present invention the groove which retains the inserts also carries the gases away from the inserts.

According to one aspect of the invention there is provided a tire mold comprising:

a cylindrical tread forming outer ring member, a plurality of tread forming insert members supported by the outer ring member characterized by:

the outer ring member having a radially inner surface for engagement with a radially outer surface of each of the insert members, a circumferentially extending slot in the radially inner surface of the outer ring, the outer ring member having an opening in communication with said slot for inserting said inert members each of the insert members having a radially extending rib for sliding engagement in the slot, the slot having a circumferentially extending indentation at a position spaced from the inner surface of the outer ring: and, the rib having a corresponding circumferentially extending projection at a position spaced from the radially outer surface for retaining each of the insert members in the outer ring while permitting sliding of the insert members in the slot for assembly and disassembly of the tread forming outer ring.

In accordance with another aspect of the invention there is provided a method of assembling a cylindrical tread forming outer ring for a tire mold wherein the outer ring has at least two segments with abutting radially extending end surfaces and each of the segments having a radially inner surface and a circumferentially extending slot in the radially inner surfaces with an opening in the end surfaces to the slot characterized by the steps of sliding rib members of a plurality of tread forming insert members into the slot at the opening for each of the segments and then connecting the segments to form a complete tread forming outer ring.

In accordance with still another aspect of the invention there is provided an insert member for mounting in an outer ring of a mold to form part of a cylindrical tread forming ring having a tread forming surface characterized by a radially outer surface having a circumferentially extending rib for sliding engagement in a slot in the outer ring, the rib having a circumferentially extending projection at a position spaced from the outer surface for retaining the insert member in the slot.

DETAILED DESCRIPTION OF THE INVENTION

Figure 1:
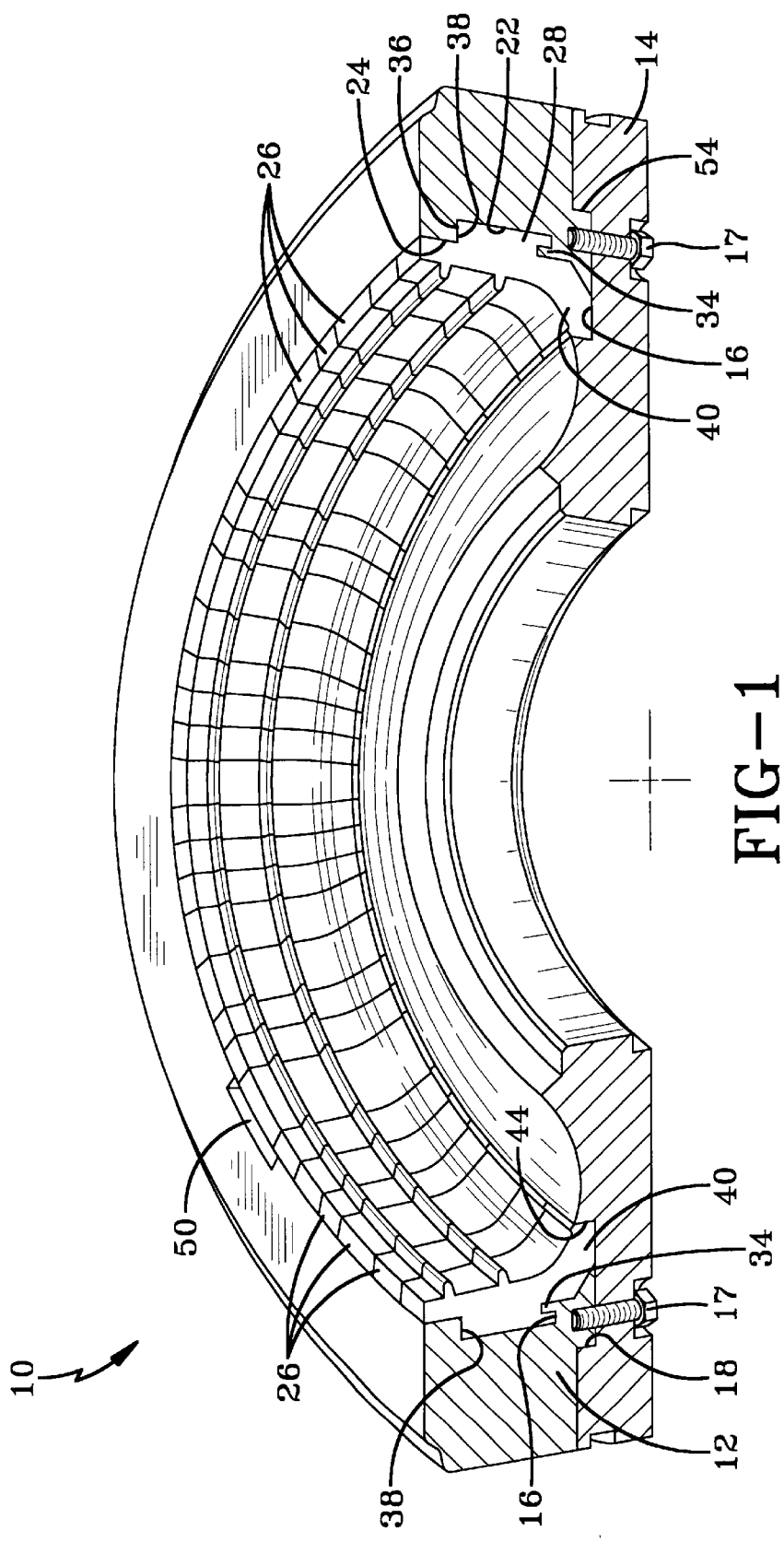
FIG. 1 is a sectional view in perspective of one half of a two piece insert mold embodying the invention.

Referring to FIG. 1, a sectional view in perspective of the bottom half of a ventless tire mold 10 is shown with a circular outer ring back 12 mounted on a circular sidewall member 14 and seated in a channel 16. Bolts 17 may be spaced around the sidewall member 14 and threaded in the outer ring back 12 to hold the parts together. The circular sidewall member 14 is circumferentially continuous as shown in FIG. 2 and the channel 16 has a radially outer edge 18 for engaging a corresponding retaining edge 20 of the ring back 12.

Figure 3:
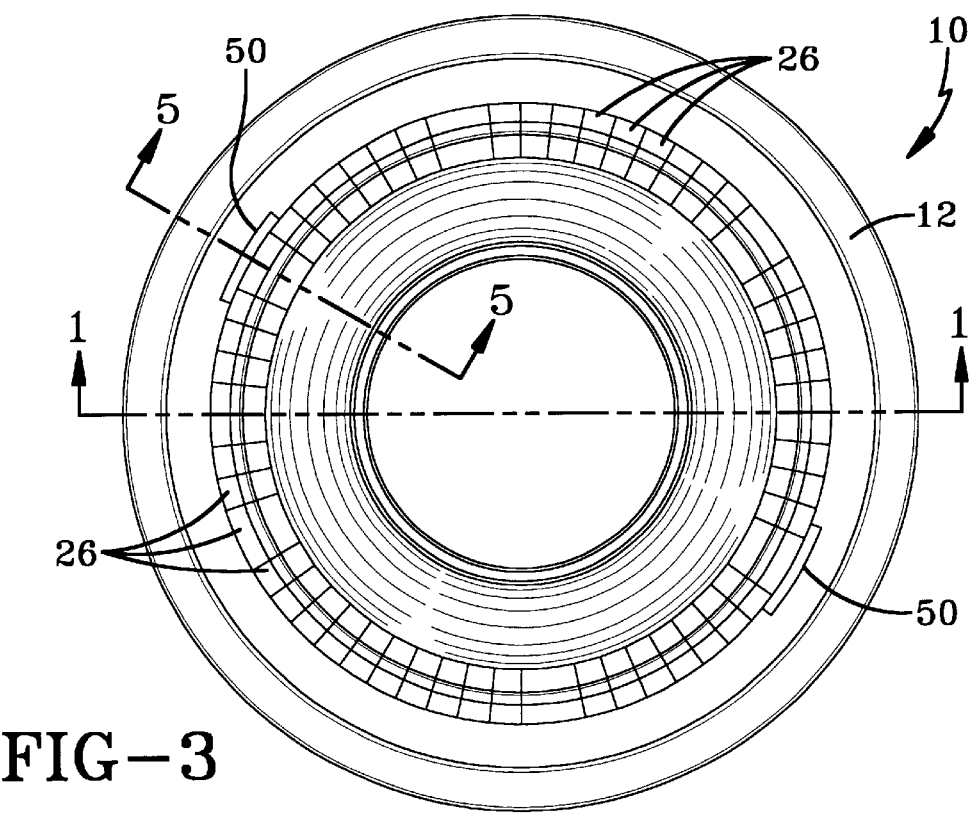
FIG. 3 is a schematic plan view of the tire mold bottom half shown in FIG. 1.
Figure 2:
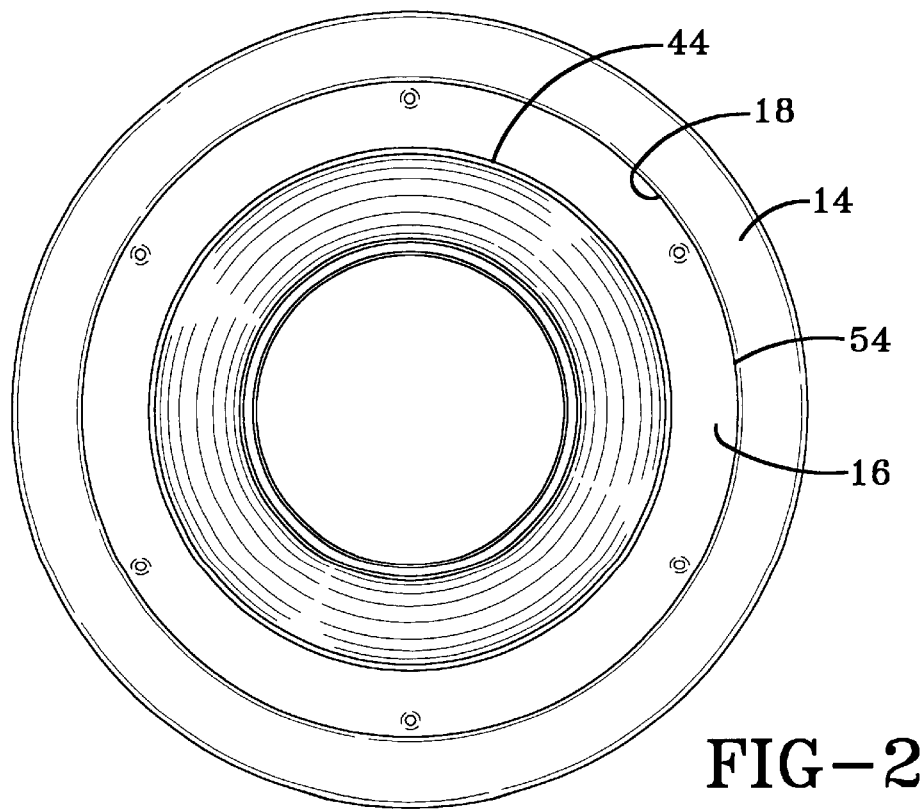
FIG. 2 is a plan view showing the circular sidewall mold member.

Referring to FIGS. 1, 2 and 3, the outer ring back 12 has a circumferentially extending slot 22 in a radially inner surface 24 for receiving a plurality of tread forming insert members 26.

Figure 4:
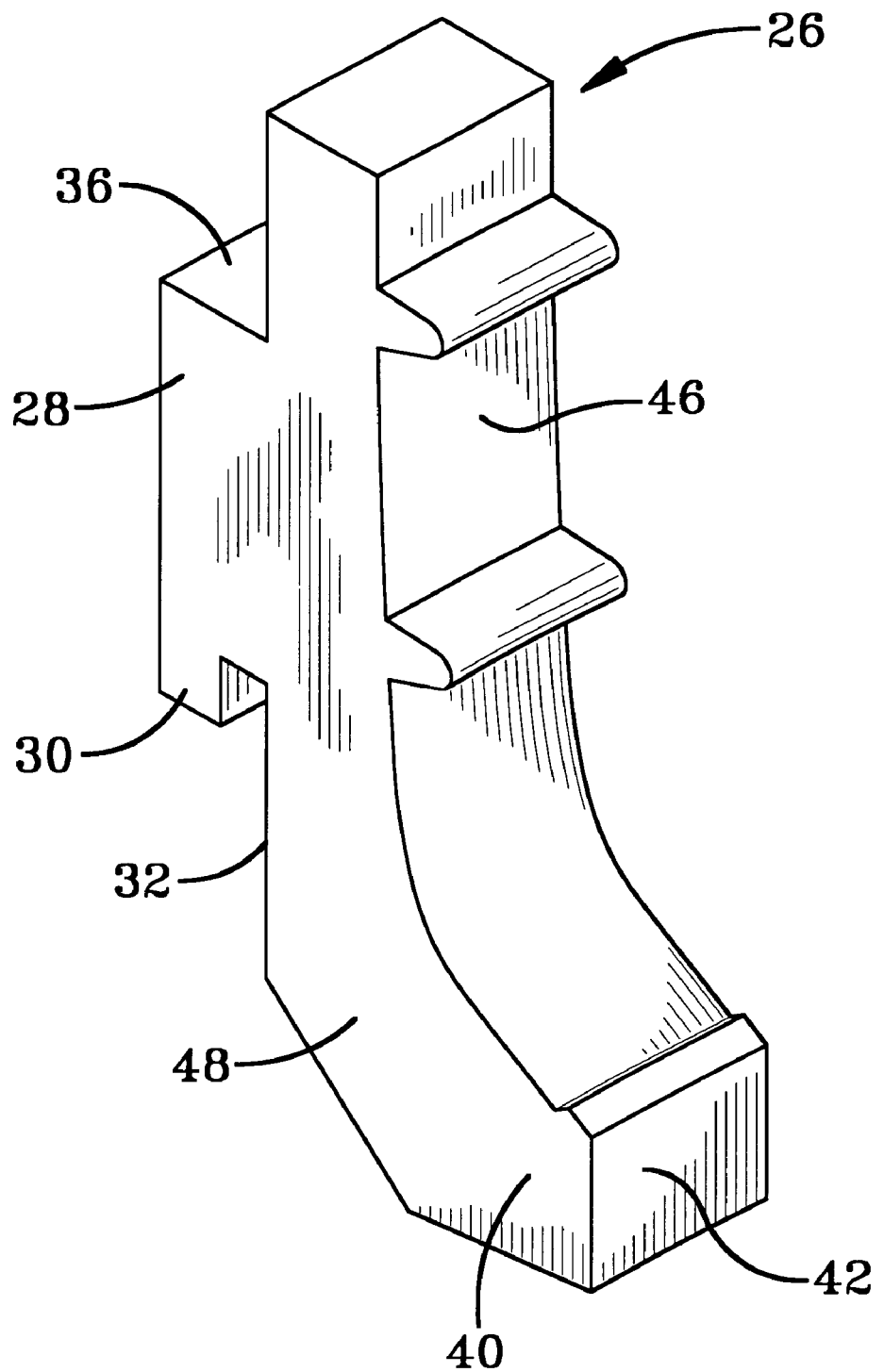
FIG. 4 is an enlarged view in perspective of one of the mold inserts.

As shown in FIG. 4, each of the insert members 26 has a radially extending rib 28 for sliding engagement in the slot 22 in the radially inner surface 24 of the outer ring back 12. A circumferentially extending projection, such as lip 30 extends axially from the edge of the rib 28 at a position spaced from a radially outward surface 32 of each of the insert members 26 for sliding engagement over a circumferentially extending flange 34 in the slot 22.

Referring to FIGS. 1 and 4, an upper edge 36 of the rib 28 engages a upper surface 38 of the slot 22. Each of the insert members 26 has a toe portion 40 with a retaining edge 42 for engagement with a radially inner offset rim 44 of the channel 16 in the circular sidewall member 14.

Each of the insert members 26 has a tread forming surface 46 and is mounted in side by side relation with abutting end surfaces 48 of adjacent insert members.

Figure 5:
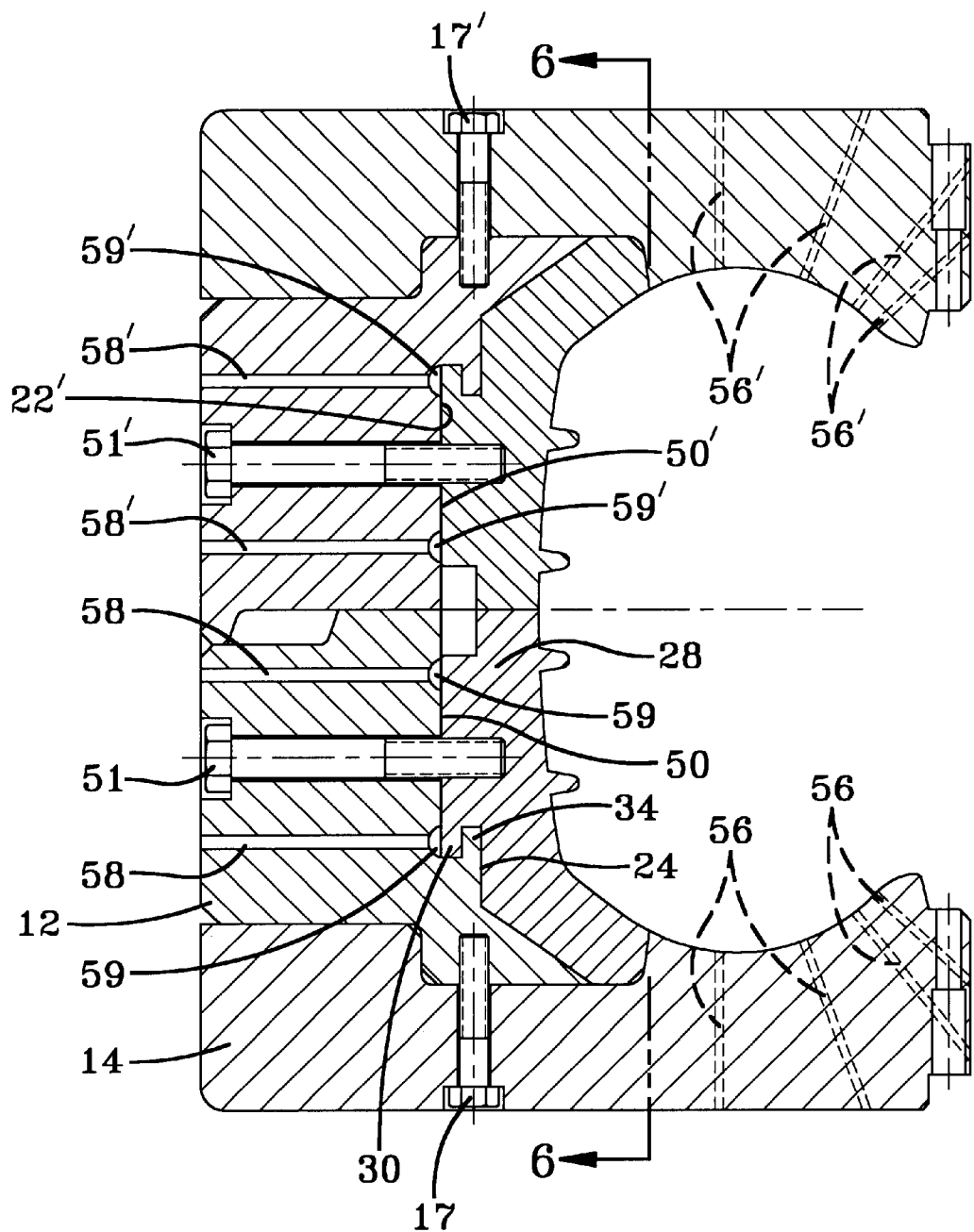
FIG. 5 is a schematic cross section of the tire mold taken along the line 5—5 in FIG. 3 embodying the invention showing the top and bottom halves of the mold and a schematic illustration of the venting.
Figure 6:
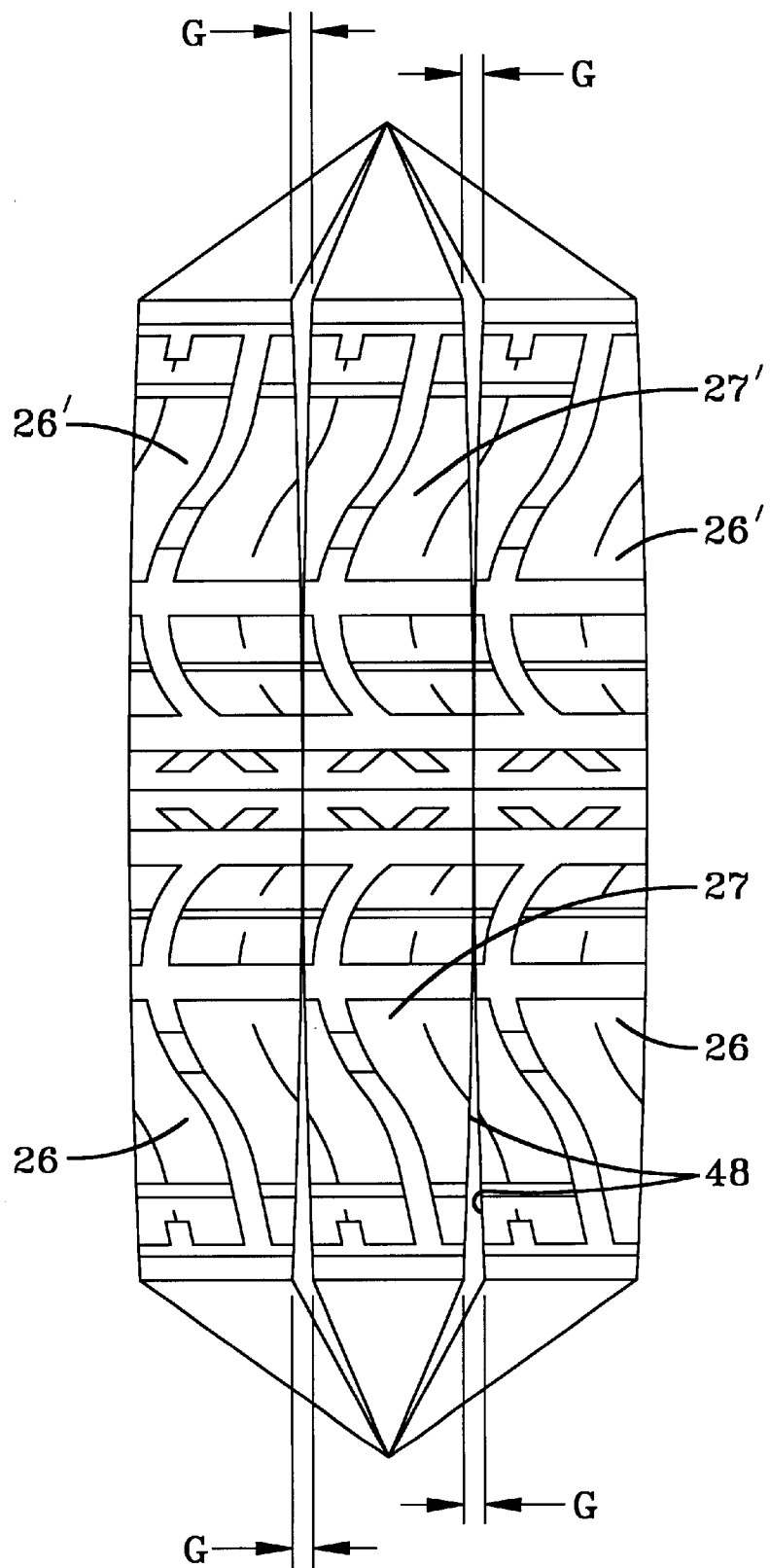
FIG. 6 is a schematic view taken along the line 6—6 in FIG. 5 showing three upper inserts and three lower inserts with a schematic illustration of the venting at the tread surface.

As shown in FIGS. 1 and 3, the circular outer ring back 12 has an opening 50 into which each of the insert members 26 may be inserted in an axial direction. Then the insert members 26 are inserted in the slots 22 in a circumferential direction. A last insert member 27 to be inserted into the opening 50 may be held in place by a fastener such as a bolt 51 threaded in a hole in the back of the insert as shown in FIG. 5. In FIGS. 5 and 6, a corresponding mold upper half is shown and the parts corresponding to the parts in the mold lower half are identified with a prime mark ('). The tread forming surface 46 may have different configurations, as for example, the tread configuration shown in FIG. 6.

After the ribs 28 of the insert members 26 are inserted in the slots 22 of the outer ring back 12, as shown in FIG. 3, the outer ring back retaining edge 42 of each of the insert members 26 is in abutting engagement with tie radially offset rim 44 of the channel 16. The outer ring back 12 has recessed bottom surfaces at the outer edge providing cylindrical surfaces 54 for abutting engagement with the radially outer edge 18 of the channel 16 in the circular sidewall member 14. It can be seen that with the assembly shown in FIG. 1 mounted in a lower half of a tire press all the insert members 26 except the last insert member 27,27' are held in position without requiring other fasteners or rings to hold them in place.

Referring to FIGS. 5 and 6, a schematic illustration is shown indicating the vents for gases exhausted from the tire cavity during molding of the tire are shown. Conventional sidewall vents are shown by lines 56. Vents 58 provided in the outer ring back 12 are in communication with circular passages 59 at the outer edges of the ring back 12 and 52 where they are in communication with an exhaust system.

In FIG. 6 the abutting surfaces 48 of the inserts 26 are shown with micro gaps G of about 0.0015 inches (0.0038 cm), which permit the exhaust of gases, and at the same time produce smooth even tread surfaces of the tire.

What is claimed is:

1. A tire mold comprising:
 a cylindrical tread forming outer ring, a plurality of tread forming insert members supported by said outer ring characterized by:
   said outer ring having a radially inner surface for engagement with a radially outer surface of each of said insert members,
   a circumferentially extending slot in said radially inner surface of said outer ring,
   said outer ring having an opening extending in axial direction in communication with said slot for access to said slot by said insert members in an axial direction,
   each of said insert members having a radially extending rib for sliding engagement in said slot in a circumferential direction after movement through said opening,
   said slot having a circumferentially extending flange at a position spaced from said inner surface of said outer ring; and,
   said rib having a corresponding circumferentially extending lip at a position spaced from said radially outer surface for retaining each of said insert members in said outer ring while permitting circumferential sliding of said insert members in said slot for assembly and disassembly of said tread forming outer ring.

2. A tire mold in accordance with claim 1 further characterized by said insert members having abutting surfaces with micro gaps of 0.0015 inches (0.0038 cm) between each of said insert members for venting gases from the mold.

3. A tire mold in accordance with claim 1 further characterized by said outer ring having an end face at said opening providing access to said circumferentially extending slot for inserting said rib of each of said insert members in an axial direction to assemble said tire mold.

4. A tire mold in accordance with claim 3 further characterized by a fastener extending between said outer ring and at least one of said insert members at said opening for retaining said at least one of said insert members in said outer ring.

5. A tire mold in accordance with claim 1 further characterized by said outer ring having a second opening in communication with said slot for access to said slot by said insert members.

6. A method of assembling a cylindrical tread forming outer ring for a tire mold wherein said outer ring has a radially inner surface and a circumferentially extending slot in said radially inner surface with an axially extending opening in an end surface of said outer ring to said slot characterized by the steps of sliding rib members of a plurality of tread forming insert members axially into said slot at said opening and then sliding said insert members circumferentially in said slot.

7. The method of claim 6 further characterized by fastening at least one of said insert members in position at said opening with a fastener connected to said outer ring.

8. The method of claim 7 further characterized by said at least one of said insert members being the last of said insert members to be inserted in said opening for holding said last of said insert members in place and preventing movement of said insert members circumferentially of said tire mold.

9. The method of claim 7 further characterized by said fasteners being a threaded bolt extending through said at least one of said insert members and includes the step of rotating said bolt into engagement with a threaded hole in said outer ring.

10. An insert member for mounting in an outer ring of a mold to form part of a cylindrical tread forming ring of a tire mold having a tread forming surface characterized by a radially outer surface having a circumferentially extending rib for sliding engagement in a slot in said outer ring, said rib having a circumferentially extending lip at a position spaced from said outer surface for retaining said insert member in said slot.

11. The insert member of claim 10 further characterized by said tread forming ring being mounted in a circular sidewall member and said insert member having a toe portion with a retaining edge for engagement with a radially inner offset rim of a channel in said circular sidewall member.

* * * * *